(12) United States Patent
Ammond et al.

(10) Patent No.: US 6,986,440 B2
(45) Date of Patent: Jan. 17, 2006

(54) ESCAPEMENT SYSTEM

(75) Inventors: John E. Ammond, Traverse City, MI (US); Timothy P. Coggins, Traverse City, MI (US); Phil A. Lang, Montrose, MI (US)

(73) Assignee: Airway Automation, Inc., Grayling, MI (US)

( * ) Notice: Subject to any disclaimer, the term of this patent is extended or adjusted under 35 U.S.C. 154(b) by 265 days.

(21) Appl. No.: 10/657,986

(22) Filed: Sep. 9, 2003

(65) Prior Publication Data
US 2005/0051569 A1    Mar. 10, 2005

(51) Int. Cl.
*B23Q 7/12*    (2006.01)
(52) U.S. Cl. ..................... 221/167; 221/173
(58) Field of Classification Search .............. 221/156, 221/157, 159, 167, 171, 173, 163; 227/119
See application file for complete search history.

(56) References Cited

U.S. PATENT DOCUMENTS 4,774,757 A  * 10/1988 Sakamoto et al. ............ 29/702
6,726,057 B2 *  4/2004 Puhawan .................... 221/165

* cited by examiner

*Primary Examiner*—Kenneth Noland
(74) *Attorney, Agent, or Firm*—Price, Heneveld, Cooper, DeWitt & Litton, LLP

(57) ABSTRACT

An escapement system for orienting a plurality of fasteners includes a housing member including a first station and a second station, and a drum member operably coupled with the housing member and adapted to move a fastener from the first station to the second station. The escapement system also includes a first seating assembly adapted to abuttingly engage the fastener at the first station and seat the fastener against the datum surface, wherein a selected one of the housing member and the drum member includes the datum surface. The escapement system further includes a first probe assembly separate from the first seating assembly and including a first probe member adapted to abuttingly engage the fastener and a first proximity switch operably coupled with the first probe, wherein the first proximity switch is configured to indicate proper alignment on the fastener within the first station.

38 Claims, 3 Drawing Sheets

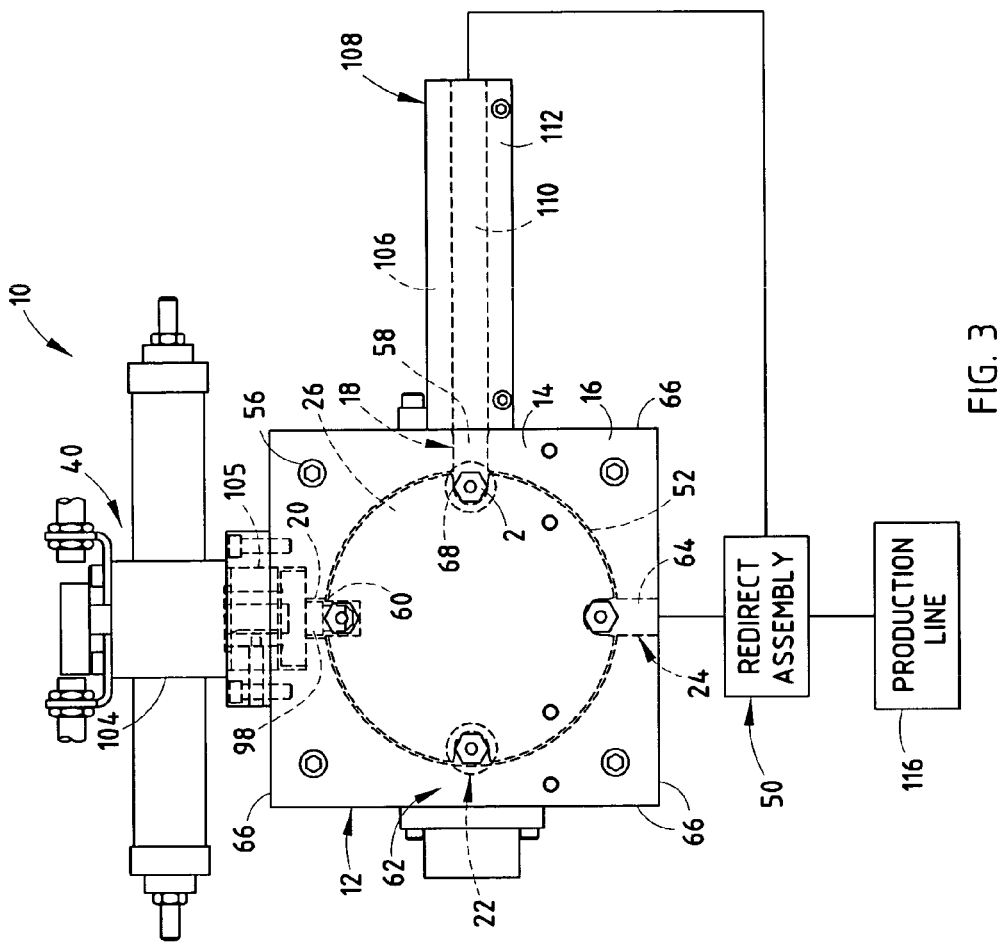
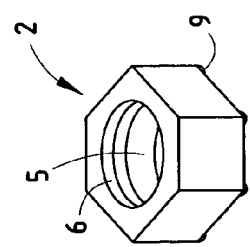
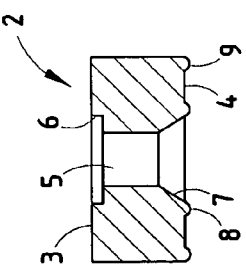

ESCAPEMENT SYSTEM

BACKGROUND OF THE INVENTION

This invention relates to a fastener delivery system, and more particularly to an escapement system for properly orienting a plurality of fasteners.

Considerable assembly time can be saved by utilizing automatic delivery of fasteners to manufacturing cells that include automatic welding machines, screw guns, multi spindle machines, and the like. Machines that perform such functions and deliver fasteners are often referred to as "feeder machines."

Heretofore, feeder machines have typically checked for proper orientation of the fasteners as the fasteners move through the feeder machine by physically probing the fastener. As a specific example, a nut 2 (FIG. 1), adapted to be welded to prefabricated components by an automatic welding machine, are typically probed for proper orientation as the nut 2 enters the feeder machine. More specifically, each nut 2 typically includes a first substantially planar surface 2, a second substantially planar surface 4 opposed across the nut 2 from the first surface 3, and a centrally located aperture 5 extending between the surfaces 3, 4. The aperture 5 includes a first counter bore 6 located proximate the first aperture 3 and having a diameter that is greater than the diameter of the central portion of the aperture 5, and a frusto-conically shaped second counter bore 7 located proximate second surface 4 and having a diameter that is greater than the diameter of the central portion of the aperture 5 and less than the diameter of the first counter bore 6. A raised ring 8 surrounds the second counter bore 7 and extends outwardly from the second surface 4. A plurality of welding nubs 9 are located at corners of the nut 2 and extend outwardly from the second surface 4. If an improper alignment of the nut is detected, the nut 2 is reoriented and subsequently fed to the welding assembly and welded in place without verifying that the nut 2 is in fact in the correct orientation. As a result, a significant number of nuts are fed to the welding machine in an improper orientation due to false reading during the initial check. The resulting part that includes the misaligned or misoriented nut must be removed from the associated assembly line and reworked by hand, or scrapped.

Therefore, an escapement system is desired that quickly and economically provides properly oriented fasteners to a manufacturing system by properly referencing the check of the orientation of the part from a reference point and assures proper orientation of the fasteners prior to delivery of the fasteners to the manufacturing cell.

SUMMARY OF THE INVENTION

One aspect of the present invention is to provide an escapement system that includes a housing member including a first station and a second station, and a drum member operably coupled with the housing member and adapted to move the fastener from the first station to the second station. The escapement system also includes a first seating assembly adapted to abuttingly engage the fastener at the first station and seat the fastener against the datum surface, wherein a selected one of the housing member and the drum member includes the datum surface. The escapement system further includes a first probe assembly separate from the first seating assembly and including a first probe member adapted to abuttingly engage the fastener and a first proximity switch operably coupled with the first probe, wherein the first proximity switch is configured to indicate proper alignment of the fastener within the first station.

Another aspect of the present invention is to provide an escapement system for orienting a plurality of nuts, wherein each nut has a first surface, a substantially planar second surface opposed across the nut from the first surface, an aperture extending between the first surface and the second surface and having a radius, a frusto conical-shaped first counter bore extending into the first surface and concentrically located with the aperture, and a cylindrically-shaped second counter bore extending into the surface concentrically located with the aperture, and having a radius that is greater than the radius of the aperture. The assembly includes a housing member including a first station and a second station, and a drum member operably coupled with the housing member and adapted to move the nut from the first station to the second station. The escapement system also includes a first seating assembly adapted to abut a selected one of the first counter bore and the second counter bore of the nut at the first station and seat the nut against a datum surface, wherein a selected one of the housing member and the drum member includes the datum surface. The escapement system further includes a first probe assembly separate from the first seating assembly and including a cylindrically-shaped first probe member having a radius that is greater than the radius of the aperture and the radius of the first counter bore, wherein the first probe member is adapted to actuate between a retracted position and an extended position, wherein the probe member is extendable into a selected one of the first counter bore and the second counter bore not abutted by the first seating assembly. The first probe assembly further includes a first proximity switch operably coupled with the first probe member, wherein the first proximity switch is adapted to register the position of the first probe member, thereby determining the orientation of the nut within the first station.

Yet another aspect of the present invention is to provide an escapement system for orienting a plurality of fasteners that includes a housing member including a first station, a second station, a third station and a fourth station. The escapement system also includes a first drum member rotatably coupled with the first member and adapted to move a fastener between the first station, the second station, the third station and the fourth station. The escapement system further includes a first seating assembly adapted to abuttingly engage the fastener at the first station and seat the fastener against a datum surface, wherein a selected one of the housing member and the drum member includes the datum surface, and a first probe assembly separate from the first seating assembly and including a first probe member adapted to abuttingly engage the fastener and a first proximity switch operably coupled with the first probe, wherein the first proximity switch is configured to indicate proper alignment of the fastener within the first station. The escapement system further includes a reorientation assembly including a second drum member that is rotatable with respect to the first drum and is adapted to receive the first fastener therein and reorient the same within the second station. The escapement system still further includes a second seating assembly adapted to abuttingly engage the fastener at the third station and seat the fastener against the datum surface, and a second probe assembly separate from the second seating assembly and including a second probe member adapted to abuttingly engage the fastener, and a second proximity switch in operable communication with the second probe, wherein the second proximity switch is indicated to indicate proper alignment of the fastener with the third station. The escapement system further includes a redirect assembly in operable communication with the fourth station of the housing and adapted to redirect the fastener to the first station if the fastener is improperly aligned that is indicated by the second proximity switch of the second probe assembly.

The present inventive escapement assembly provides fasteners and the like quickly and economically to an associated manufacturing system in a proper orientation while assuring a high probability of proper alignment, thereby increasing efficiency and reducing scrap rates of the resultant parts. The escapement assembly results in reduced manufacturing costs, is capable of a long operating life, and is particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 1 is a perspective view of a fastener, specifically a nut, for seating;

FIG. 2 is a cross-sectional side view of the fastener;

FIG. 3 is a front elevational view of the escapement assembly embodying the present invention;

DETAILED DESCRIPTION OF THE PREFERRED EMBODIMENTS

Figure 4:
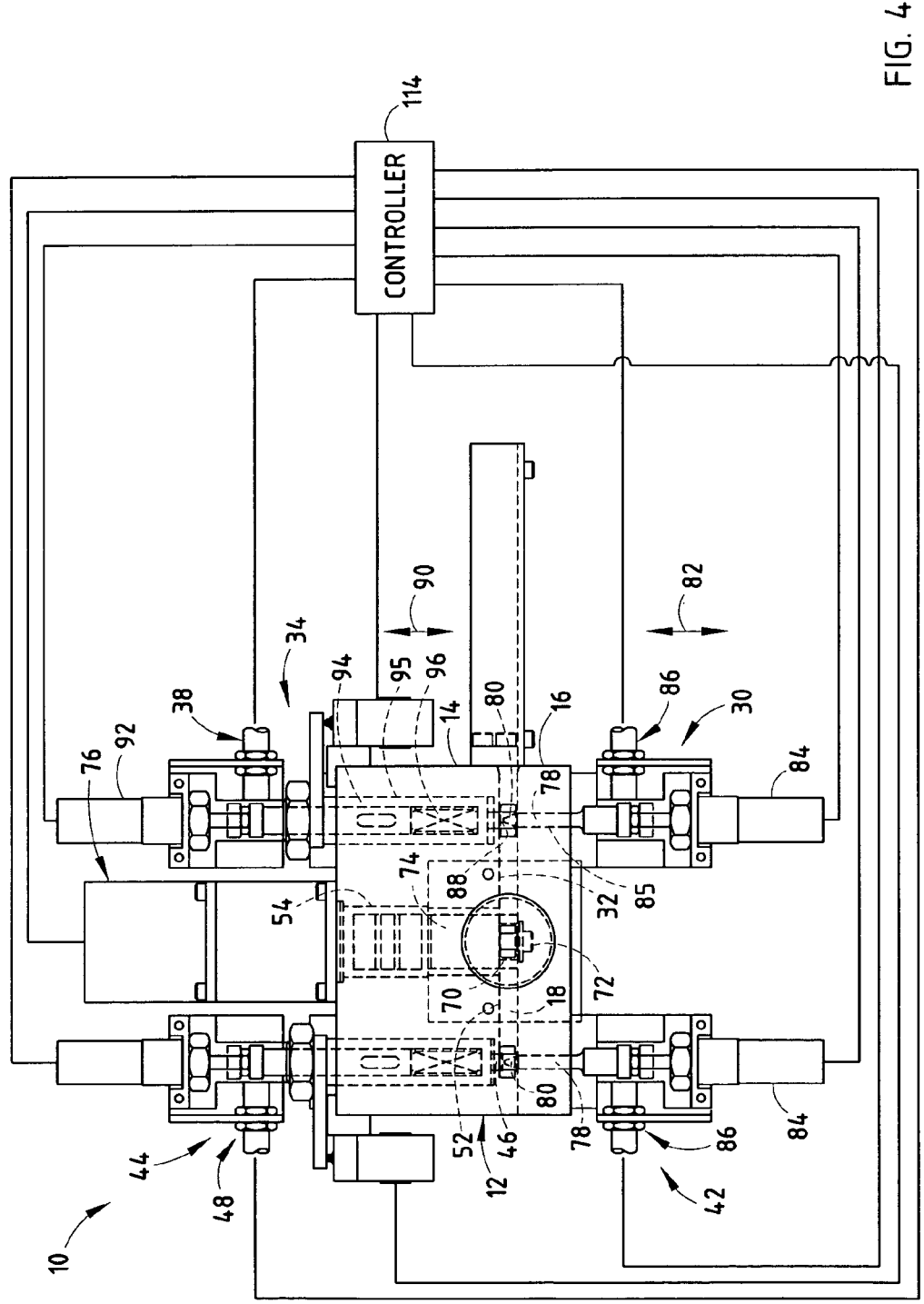
FIG. 4 is a top plan view of the escapement assembly.
Figure 6:
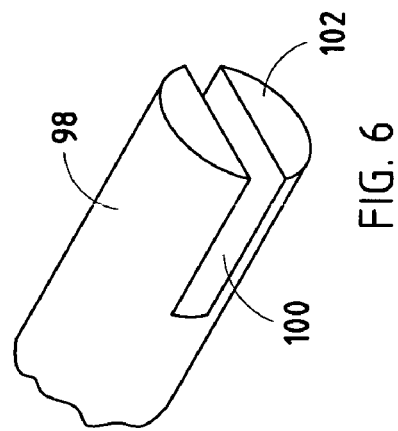
FIG. 6 is a perspective view of the escapement assembly.
Figure 5:
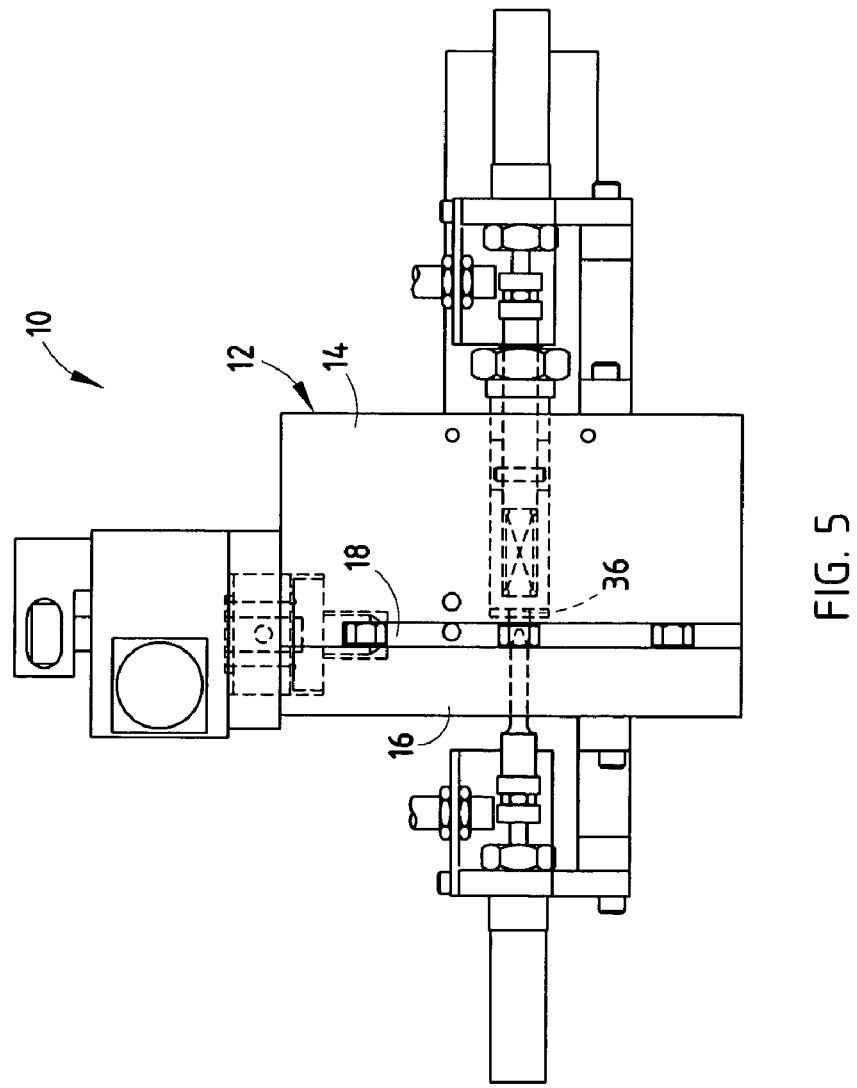
FIG. 5 is a side elevational view of the escapement assembly.

For purposes of description herein, the terms "upper," "lower," "right," "left," "rear," "front," "vertical," "horizontal," and derivatives thereof shall relate to the invention as oriented in FIGS. 3–5. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIGS. 3–5) generally designates an escapement assembly embodying the present invention. In the illustrated example, the escapement assembly 10 includes a housing 12 having a body member 14 and a cover 16, and defining a first station 18, a second station 20, an third station 22 and a fourth station 24. The escapement assembly 10 also includes a drum member 26 rotatably coupled with the housing 12 and adapted to move the fastener 2 between the first, second, third and fourth stations 18, 20, 22, 24. The escapement assembly 10 further includes a first seating assembly 30 adapted to abuttingly engage the aperture 5 of the fastener 2 at the first station 18 and seat the fastener 2 against a datum surface 32 of the body member 14. A first probe assembly 34, separate from the first seating assembly 30, includes a first probe member 36 that is adapted to abuttingly engage the aperture 5 of the fastener 2. A proximity switch 38 is operably coupled with the probe member 36, and is configured to indicate whether the fastener 2 is properly aligned within the first station 18. A reorientation assembly 40 is aligned with the second station 20 and is adapted to reorient the fastener 2 if an improper orientation is indicated by the proximity switch 38 of the probe assembly 34. A second seating assembly 42 abuttingly engages the aperture 5 of the fastener 2 at the third station 22 and seats the fastener 2 against the datum surface 32. A second probe assembly 44, separate from the second seating assembly 42, includes a second probe member 46 that abuttingly engages the aperture 5 of the fastener 2. A second proximity switch 48 is in operable communication with the second probe member 46 and is configured to indicate whether the fastener 2 is properly aligned within the third station 22. A redirect assembly 50 is in operable communication with the fourth station 24 of the housing 12 and is adapted to redirect the fastener 2 to the first station 18 if the fastener 2 is improperly aligned as indicated by the second proximity switch 48 of the second probe assembly 44.

The body member 14 of the cover 16 includes a disk-shaped cavity 52, and an aperture 54 extending through the body member 14 and concentrically located with the cavity 52. The cover 16 is affixed to the body member 14 by a plurality of machine bolts 56, thereby enclosing the cavity 52. The first, second and fourth stations 18, 20, 24 are each defined by a slot 58, 60, 64, respectively, extending between the cavity 52 and an associated sidewall 66 of the body member 14, while third station 22 is located at a position 62 as defined by the correspondingly located first, second and fourth stations 18, 20, 24. The slots 58, 60, 64 are sized to allow sliding passage of the fastener 2 therethrough.

The drum member 26 is substantially disk-shaped and includes a plurality of notches 68 spaced about an outer periphery thereof so as to align with the stations 18, 20, 22, 24 of the housing 12. The notches 68 are sized to receive fasteners 2 therein. The drum member 26 also includes a centrally-located aperture 70 extending therethrough and receiving a bolt 72 therein that affixes the drum member 26 for rotation with a coupler assembly 74 that is driven in rotation by a pneumatic indexing mechanism 76, or an electric servomotor.

As the first seating assembly 30 and the second seating assembly 42 are substantially similar, the description of the first seating assembly 30 should be considered descriptive of both seating assemblies 30, 42. The seating assembly 30 includes a crowder pin 78 having a circular cross-sectional configuration and a tapered or distal abutment end 80, and is driven in a linear reciprocating path in a direction as indicated and represented by directional arrow 82 by a pneumatic cylinder 84 through an aperture 85 within the cover 16. The distal abutment end 80 is shaped to be properly received within the frusto conically-shaped second counter bore 7 of the fastener 2, however, may be received within the first counter bore 6 as well, as described below. A proximity sensor 86 is operably coupled with the crowder pin 78 so as to detect the location of the crowder pin 78, and specifically whether the distal end 80 of the crowder pin 78 is properly seated within the fastener 2, as described below. The first seating assembly 30 is aligned with the first station 18 of the housing 12 such that the distal end 80 of the crowder pin 78 is received within the central aperture 5 of the fastener 2 when the fastener 2 is located within the notch 68 of the drum member 26 when aligned with the first station 18 of the housing 12. The second seating assembly 42 is aligned with the third station 22 of the housing 12 such that the distal end 80 of the crowder pin 78 of the second seating assembly 42 is received within the central aperture 5 of the fastener 2 when the fastener 2 is located within the notch 68 of the drum member 26 when aligned with the third station 22 of the housing 12.

As the first probe assembly 34 and the second probe assembly 44 are similar in construction, the description of the first probe assembly 34 as contained herein should be considered descriptive of both the first probe assembly 34 and the second probe assembly 44. The probe member 36 of the probe assembly 34 has a circularly-shaped cross-sectional geometry and includes a distal end 88 sized to be received within the counter bore 6 of the central aperture 5 of the fastener 2, as described below. The probe member 36 has a diameter that is slightly less than the diameter of the first counter bore 6 of the fastener 2 and is slightly greater than the diameter of the second counter bore 7, thereby allowing the probe member 36 to be received to a greater depth within the first counter bore 6 than the second counter bore 7, as described below. The probe member 36 is driven in a linearly reciprocating path in a direction as indicated and represented by arrow 90 by a pneumatic cylinder 92. The probe member 36 slides within a sleeve bushing 94 located within an aperture 95 extending through the body member 14 of the housing 12, and is biased towards a retracted position by a spring member 96, as described below. A proximity switch 38 is operably coupled with the probe member 36 so as to monitor whether the probe member 36 is properly seated within a central aperture 5 of fastener 2, when the notch 68 of the drum member 26 is aligned with the first station 18 of the housing 12. The second probe assembly 44 is aligned with the third station 22 of the housing 12 such that the probe member 36 of the second probe assembly is abuttingly received within the aperture 5 of the fastener 2 when the notch 68 of the drum member 26 cradling the fastener 2 is properly aligned with the third station 22.

The reorientation assembly 40 includes a substantially cylindrically shaped drum member 98 (FIG. 4) having a centrally-located notch 100 extending inwardly from an end 102 thereof, and configured to receive the fastener 2 therein. The drum member 98 is coupled for rotation to a pneumatic rotary actuator 104 via a coupler assembly 105. The drum member 98 is sized so as to rotate within the notches 68 of the drum member 26, while the notch 100 is sized so as to allow the drum member 26 therethrough as described below.

In operation, a plurality of fasteners 2 are fed to the first station 18 of the housing 12 via a track assembly 108 that includes a track 106 having a channel 110 extending therealong and sized to slidably receive the fasteners 2 therein, and a cover member 112 that is affixed to the track 108 via a plurality of bolts to enclose the channel 110. Each fastener 2 slides through slot 58 within the housing 12 and into a notch 68 of the drum 26 that is aligned therewith. A controller 114 then advances the crowder pin 78 of the seating assembly 30 via the pneumatic cylinder 84 until the distal end 88 is seated within the aperture 5 of the fastener 2 and the opposite side of the fastener 2 is seated against the datum surface 32. Specifically, the distal end 88 is seated within either the counter bore 6 or the counter bore 7 depending upon the orientation of the fastener within the first station 18 and the notch 68. The crowder pin 78 is advanced until the associated proximity sensor 86 indicates that the crowder pin 78 has been moved to a position where the fastener 2 should be seated against the datum surface 2. The controller 114 then advances the probe member 46 via the pneumatic cylinder 92, thereby overcoming the biasing force of the spring member 96 and seating the probe member 36 within the aperture 5 of the fastener 2, and more specifically into either the counter bore 6 or the counter bore 7 depending upon the orientation of the fastener 2 within the first station 18 and the notch 68.

The depth of the probe member 36 within the aperture 5 of the fastener 2 is monitored via the proximity switch 38, which is preferably an optical-type proximity switch. The readings as provided by the proximity switch 38 are then relayed to the controller 114 which records whether the probe member of the first proximity switch 78 was received to a proper depth within the aperture 5 of the fastener 2. The crowder pin 78 and the probe member 36 are then withdrawn from engaging abutment within the aperture 5 of the fastener 2, and the drum member 26 is rotated within the housing 12 via the indexing mechanism 76 until the subject fastener 2 is located at the second station 2 of the housing 12. If the fastener 2 was found to be incorrectly oriented within the first station 18, as monitored by the probe assembly 34 and recorded by the controller 114, the reorientation assembly 40 reorients the fastener 2 within the second station 20. Specifically, the drum member 98 is rotated 180° via the rotary actuator 104. The drum member 26 is then rotated within the housing 12 until the subject fastener 2 is positioned at the third station 22. The orientation of the fastener 2 within the third station 22 is then re-checked via the second seating assembly 42 and the second probe assembly 44 in similar fashion to the orientation check at the first station 18 by the first seating assembly 30 and the first probe assembly 34. The drum member 26 is then rotated within the housing 12 until the subject fastener 102 is positioned at the fourth station 24 where the fastener 2 drops through the slot 64 of the fourth station 24 via gravitational forces. If the fastener 2 was found to be improperly oriented at the third station 22 by the second probe assembly 44, the fastener 2 is redirected via the redirect assembly 50, the specifics of which are well known in the art, and the fastener 2 is redirected to the track assembly 108 and eventually to the first station 18. Should the fastener 102 be found by the second probe assembly 44 to be properly oriented, the fastener 2 is not redirected by the redirect assembly 50 and is instead supplied to the associated production line 116, manufacturing cell, automated welding machine, or other associated devices.

The present inventive escapement assembly provides fasteners and the like quickly and economically to an associated manufacturing system in a proper orientation while assuring a high probability of proper alignment, thereby increasing efficiency and reducing scrap rates of the resultant parts. The escapement assembly results in reduced manufacturing costs, is capable of a long operating life, and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their express language state otherwise.

The invention claimed is:
1. An escapement system for orienting a plurality of fasteners, comprising:
    a housing member including a first station and a second station;
    a drum member operably coupled with the housing member and adapted to move a fastener from the first station to the second station;
    a first seating assembly adapted to abuttingly engage the fastener at the first station and seat the fastener against a datum surface, wherein a selected one of the housing member and the drum member includes the datum surface; and a first probe assembly separate from the first seating assembly and including a first probe member adapted to abuttingly engage the fastener and a first proximity switch operably coupled with the first probe member, wherein the first proximity switch is configured to indicate proper alignment of the fastener within the first station.

2. The escapement system of claim 1, wherein the first seating assembly includes a first crowder pin that is adapted to abut a surface of the fastener.

3. The escapement system of claim 2, wherein the first crowder pin is operably driven by a first pneumatic cylinder.

4. The escapement system of claim 2, wherein the first probe of the first probe assembly is adapted to be abuttingly received within only one aperture of the fastener.

5. The escapement system of claim 4, wherein the first probe of the first probe assembly is operably driven by a second pneumatic cylinder.

6. The escapement system of claim 1, wherein the drum member includes a circularly-shaped plate member rotatably coupled with the housing member.

7. The escapement system of claim 6, wherein the drum member is driven by a first pneumatic indexing mechanism.

8. The escapement system of claim 1, wherein the housing member includes the datum surface.

9. The escapement system of claim 1, wherein the first proximity switch of the first probe assembly includes an optical switch.

10. The escapement system of claim 1, further including:
a reorientation assembly aligned with the second station and adapted to reorient the fastener if improperly oriented as indicated by the proximity switch of the probe assembly.

11. The escapement system of claim 10, wherein the reorientation assembly includes a second drum member adapted to receive the fastener therein, and wherein the drum member is rotatable with respect to the first drum member.

12. The escapement system of claim 11, wherein the second drum is driven by a pneumatic-type rotary actuator.

13. The escapement system of claim 10, wherein the housing member further includes a third station and a forth station, and wherein the drum member is further adapted to move the fastener from the second station to the third and fourth stations; and further including:
a second seating assembly adapted to abuttingly engage the fastener at the third station and seat the fastener against the datum surface; and
a second probe assembly separate from the second seating assembly and including a second probe member adapted to abuttingly engage the fastener, and a second proximity switch in operable communication with the second probe member, wherein the second proximity switch is configured to indicate proper alignment of the fastener within the third station.

14. The escapement system of claim 13, wherein the second seating assembly includes a second crowder pin that is adapted to abut a surface of the fastener.

15. The escapement system of claim 13, wherein the second crowder pin is operably driven by a third pneumatic cylinder.

16. The escapement system of claim 13, wherein the second probe of the second probe assembly is adapted to be abuttingly received within only one aperture of the fastener.

17. The escapement system of claim 16, wherein the second probe of the second probe assembly is operably driven by a fourth pneumatic cylinder.

18. The escapement system of claim 13, further including:
a redirect assembly in operable communication with the fourth station of the housing and adapted to redirect the fastener to the first station if the fastener is improperly aligned as indicated by the second proximity switch of the second probe assembly.

19. The escapement system of claim 1, further including:
a feeder track in operable communication with the first station of housing and adapted to deliver the fastener thereto.

20. The escapement system of claim 13, wherein the second proximity switch of the second probe assembly includes an optical switch.

21. An escapement system for orienting a plurality of nuts, each nut having a first surface, a substantially planar second surface opposed across the nut from the first surface, an aperture extending between the first surface and the second surface and having a radius, a frusto conical-shaped first counter bore extending into the first surface and concentrically located with the aperture, and a cylindrically-shaped second counter bore extending into the second surface, concentrically located with the aperture, and having a radius that is greater than the radius of the aperture; the escapement comprising:
a housing member including a first station and a second station;
a drum member operably coupled with the housing member and adapted to move the nut from the first station to the second station;
a first seating assembly adapted to abut a selected one of the first counter bore and the second counter bore of the nut at the first station and seat the nut against a datum surface, wherein a selected one of the housing member and the drum member includes the datum surface; and
a first probe assembly separate from the first seating assembly and including a cylindrically-shaped first probe member having a radius that is greater than the radius of the aperture and the radius of the first counter bore, the first probe member is adapted to actuate between a retracted position and an extended position, wherein the probe member is extendable into a selected one of the first counter bore and the second counter bore not abutted by the first seating assembly, the first probe assembly further including a first proximity switch operably coupled with the first probe member, wherein the first proximity switch is adapted to register the position of the first probe member, thereby determining the orientation of the nut within the first station.

22. The escapement system of claim 21, wherein the first seating assembly includes a first crowder pin having a cone-shaped end that is adapted to the selected one of the first counter bore and the second counter bore.

23. The escapement system of claim 22, wherein the first crowder pin is operably driven by a first pneumatic cylinder that is in operable communication with the controller.

24. The escapement system of claim 23, wherein the first probe of the first probe assembly is operably driven by a second pneumatic cylinder.

25. The escapement system of claim 21, wherein the drum member includes a circularly-shaped plate member rotatably coupled with the housing member.

26. The escapement system of claim 25, wherein the drum member is driven by a first pneumatic indexing mechanism.

27. The escapement system of claim 21, wherein the housing member includes the datum surface.

28. The escapement system of claim 21, wherein the first proximity switch of the first probe assembly includes an optical switch.

29. The escapement system of claim 21, further including:
a reorientation assembly aligned with the second station and adapted to reorient the fastener if improperly oriented as indicated by the first proximity switch of the first probe assembly.

30. The escapement system of claim 29, wherein the reorientation assembly includes a second drum member adapted to receive the fastener therein, and wherein the drum member is rotatable with respect to the first drum member.

31. The escapement system of claim 30, wherein the second drum is driven by a pneumatic-type rotary actuator.

32. The escapement system of claim 29, wherein the housing member further includes a third station and a forth station, and wherein the drum member is further adapted to move the fastener from the second station to the third and fourth stations; and further including:
a second seating assembly adapted to abut a selected one of the first counter bore and the second counter bore of the nut at the third station and seat the nut against the datum surface; and
a second probe assembly separate from the second seating assembly, and including a cylindrically-shaped second probe member having a radius that is greater than the radius of the aperture and the radius of the first counter bore, the first probe member being adapted to actuate between a retracted position and an extended position, wherein the probe member extends into a selected one of the first counter bore and the second counter bore not abutted by the second seating assembly, the second probe assembly further including a second proximity switch operably coupled with the second probe member, wherein the second proximity switch is adapted to register the position of the second probe member, thereby determining the orientation of the nut within the third station.

33. The escapement system of claim 32, wherein the second seating assembly includes a second crowder pin that is adapted to abut a surface of the fastener.

34. The escapement system of claim 32, wherein the second crowder pin is operably driven by a third pneumatic cylinder.

35. The escapement system of claim 34, wherein the second probe of the second probe assembly is operably driven by a fourth pneumatic cylinder.

36. The escapement system of claim 32, further including:
a redirect assembly in operable communication with the controller and with the fourth station of the housing and adapted to redirect the fastener to the first station if the fastener is improperly aligned as indicated by the second proximity switch of the second probe assembly.

37. The escapement system of claim 21, further including:
a feeder track in operable communication with the first station of housing and adapted to deliver the fastener thereto.

38. An escapement system for orienting a plurality of fasteners, comprising:
a housing member including a first station, a second station, a third station, and a fourth station;
a first drum member rotatably coupled with the housing member and adapted to move a fastener between the first station, the second station, the third station and the fourth station;
a first seating assembly adapted to abuttingly engage the fastener at the first station and seat the fastener against a datum surface, wherein a selected one of the housing member and the drum member includes the datum surface;
a first probe assembly separate from the first seating assembly, and including a first probe member adapted to abuttingly engage the fastener and a first proximity switch operably coupled with the first probe, wherein the first proximity switch is configured to indicate proper alignment of the fastener within the first station;
a reorientation assembly including a second drum member that is rotatable with respect to the first drum, and is adapted to receive the fastener therein and reorient the same;
a second seating assembly adapted to abuttingly engage the fastener at the third station and seat the fastener against the datum surface;
a second probe assembly separate from the second seating assembly and including a second probe member adapted to abuttingly engage the fastener, and a second proximity switch in operable communication with the second probe, wherein the second proximity switch is configured to indicate proper alignment of the fastener within the third station; and
a redirect assembly in operable communication with the fourth station of the housing and adapted to redirect the fastener to the first station if the fastener is improperly aligned as indicated by the second proximity switch of the second probe assembly.

* * * * *